United States Patent Office 2,781,939
Patented Feb. 19, 1957

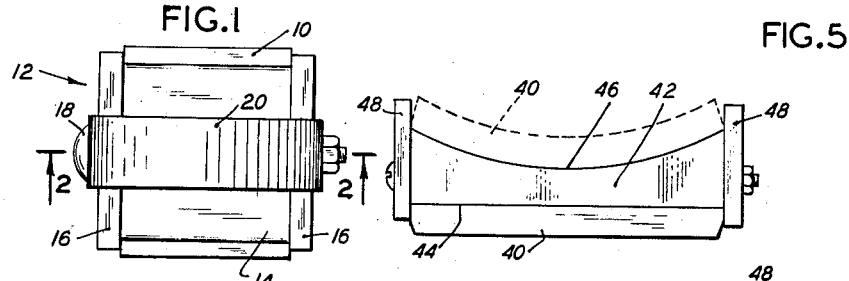

2,781,939

MAGNETIC TANK PATCHING DEVICE

Arlie F. Lockwood, Portland, Oreg.

Application October 20, 1955, Serial No. 541,660

4 Claims. (Cl. 220—24)

This invention relates to a magnetic tank patching device and more particularly to a device having a sealing pad of flexible resilient material held against the outer wall of a tank by means of a holding structure including one or more permanent magnets.

The device of the present invention is primarily intended for making rapid but effective repairs to tanks such as oil tanks for domestic heating apparatus or water tanks for domestic hot water storage. A variety of patching devices have been suggested for making more or less permanent patches on oil or other types of tanks found in the home including thread cutting screws having an enlarged head under which a gasket is positioned as well as resilient patches held to a tank by a plurality of such thread cutting screws and also patches adhesively held to the outer surface of the tank. Such patches are difficult to apply and are frequently not effective in stopping a leak in a tank. The patching device of the present invention, however, is effective for stopping leaks in any tank made of magnetic materials such as iron and can be applied by merely placing the patch in position. That is to say, the patch includes one or more permanent magnets providing magnetic pole portions on opposite sides of or spaced around a pad of flexible resilient material, such as rubber or rubber-like material, the magnetic pole portions being connected by a backing portion which presses the sealing pad against the surface of the wall of the tank. Modern permanent magnets which are made of magnetic alloys, exert sufficient force when brought into close contact with a wall of ferrous metal that the sealing pad is pressed tightly against the wall. The sealing pad has a sealing surface which is positioned over the hole or holes in the wall of the tank it is desired to seal and the arrangement of magnetic poles and backing portion is such that the pad is held under sufficient pressure to prevent leakage from the tank. The patch finds its greatest utility in sealing holes in oil tanks for domestic heating systems but can also be employed to stop holes in domestic hot water tanks or other tanks as the pad will be effective to prevent leakage even though the tank contains fluids under substantial pressure.

It is therefore an object of the present invention to provide an improved device for patching tanks to prevent leakage therefrom.

Another object of the invention is to provide an improved tank patching device in which permanent magnets are employed to hold a sealing pad securely against a wall of a tank having a leak therein.

Another object of the invention is to provide a magnetic tank patching device employing permanent magnets for holding a compressible pad of flexible resilient material against a wall of a tank having a leak therein.

A further object of the invention is to provide a tank patching device which can be rapidly applied to the wall of a tank having a leak therein and which will remain in sealing position indefinitely after having been merely placed in position on the wall of the tank.

A still further object of the invention is to provide a magnetic tank patching device which may be applied to the outer wall of a tank having a leak therein and which will effectively seal a leak in either a plane or a convex surface.

Other objects and advantages of the invention will appear in the following description of preferred embodiments thereof shown in the attached drawings of which:

Fig. 1 is a top view of a device in accordance with the present invention;

Fig. 2 is a vertical section through the device of Fig. 1 taken on the line 2—2 of Fig. 1 and showing the device in position upon the wall of a tank;

Fig. 3 is a side elevation of a modified tank patching device in accordance with the present invention;

Fig. 4 is a bottom view of the device of Fig. 3;

Fig. 5 is a side elevation of a further modified tank sealing device;

Fig. 6 is a top view of the device of Fig. 5;

Fig. 7 is an end view of the device of Fig. 5;

Fig. 8 is a side elevation of a further modified tank sealing device; and

Fig. 9 is an end view of the device of Fig. 8.

The tank patching device of Figs. 1 and 2 includes a sealing pad 10 of any suitable flexible resilient material such as rubber or rubber-like material, a porous rubber having closed pores so as to be impervious to liquids or gases but having greater compressibility than usual rubber or rubber-like material is preferred. For oil tanks a porous oil resistant synthetic rubber such as neoprene is particularly suitable. The patching device also includes a pad holding structure 12 made up of a permanent magnet 14 forming the backing portion for the pad 10. The permanent magnet 14 has flat ends and pole pieces 16, preferably in the form of plates of iron or soft steel are secured to the ends of the magnet 14 by means of a bolt 18 extending through suitable bores in the permanent magnet 14 and pole pieces 16. The bolt 18 may also secure a handle 20 to the ends of the device, the handle 20 being of U-shape and also having suitable bores in its ends through which the bolt 18 extends. The handle 20 extends upwardly from the pole pieces 16 and is preferably of nonmagnetic material such as an aluminum alloy so as to prevent short circuiting the flux of the magnet 14. The pole pieces 16 project downwardly from the ends of the permanent magnet 14, i. e., in a direction opposite to the handle 20 and terminate in surfaces 22 for engagement with the wall of a tank, the patching device being shown in position upon the wall 24 of such a tank in Figure 2.

The projecting portions of the pole pieces 16 in conjunction with the magnet 14 provide a recess for the reception of the resilient pad 10. The depth of such recess, i. e., the distance between the surfaces 22 and the lower surface of the magnet 14 is preferably somewhat less than the thickness of the pad 10, for example, the depth of such recess may be three-eighths of an inch whereas the thickness of the pad of porous rubber may be one-half inch, the pad 10 being shown in compressed position in Figure 2. Magnets made of modern magnetic alloys have sufficient strength to cause the device shown in Figs. 1 and 2 which, for example, may be approximately two inches square to adhere to the wall 24 of a tank with sufficient force to stop leakage through a hole such as the hole 26 indicated in Figure 2, even though substantial liquid or gas pressure exists inside the tank and the patching device is applied to the exterior wall of the tank.

For larger holes or areas in which there are several holes, such as a badly corroded area in the bottom of an oil tank, the device of Figs. 3 and 4 is more suitable. The sealing pad holding structure of these figures may include two magnetic structures 12 which may be of the same type as those disclosed in Figs. 1 and 2. The pad 10 of Figs. 1 and 2 is, however, not employed in the device of Figs. 3 and 4 but instead the pad holding structure of these figures also includes a resilient metallic backing member 28, preferably of nonmagnetic spring material, such as brass or bronze. The backing member 28 is provided with a pair of slots 30, one adjacent each end of the backing member, for receiving one of the projecting pole pieces 16 of each structure 12. Such pole piece 16 extends through a slot 30 and is held against accidental withdrawal by a cotter pin 32. As shown in Fig. 3, the spring backing member 28 is preferably bowed so as to be curved longitudinally thereof to provide a convex lower surface. A sealing pad 34 is positioned with its back surface against the convex surface of the backing member 28 and may be held between tabs 36 struck out of the backing member 28.

The pad 34 provides a sealing surface 38 for positioning against the outer wall of a tank and the pole pieces 16 of the holding structure, when positioned against the surface of such tank, compress the pad 34 by reason of resilient pressure exerted by the backing member 28 so that the sealing surface is pressed against the wall of the tank in an effective manner. It is merely necessary to position the pad in the desired location on the tank covering the points of leakage and then to press the structures 12 against the surface of the tank. The device of Figs. 3 and 4 may be employed upon a plane surface and also the backing member 28 has sufficient resiliency that the device including the pad 34 will conform to the curvature of usual tanks if the device is placed such that the backing member 28 extends or has its longitudinal dimension in the direction of the curvature of the tank. The handles 20 can be employed to remove the patching device from the tank, for example, if such device is initially positioned incorrectly and it will be found that a substantial amount of force is required for removing each of the structures 12 from engagement with a tank.

A further modified device is shown in Figs. 5 to 7, inclusive. The device of these figures includes a sealing pad 40 and a holding structure including a permanent magnet 42 which has a plane surface surface 44 on one face and an arcuate surface on its other face. The surfaces referred to are of substantial extent, for example, such surfaces can be 5" x 4". Pole pieces of iron or soft steel are secured to the ends of the magnet 42 and project therefrom to provide recesses for the pad 40, such pad being shown in position in full lines in the recess adjacent the plane surface 44 of the magnet and being shown in dotted lines in the position it can occupy against the arcuate surface 46. The position of the pad 40 shown in Figs. 5 to 7 is that ordinarily employed to seal a leak on the flat surface of a tank, whereas the position of the pad shown in dotted lines in Fig. 5 is that employed for sealing a leak in the curved portion of the wall of a tank. In employing the patching device of Figures 5 to 7, the pad is positioned in one of the recesses formed by the pole pieces 48 and the device is then placed in position against the tank wall. The magnetic force holding the device against the wall is substantial and such device is difficult to remove from such wall. As shown in Fig. 7, the pole pieces are preferably provided with slots 50 extending therethrough so as to enable a tool, such as a screwdriver, to be employed to remove the device from the tank wall. By inserting the blade of a screwdriver in one or the other of such slots, the device can be lifted away from the wall of the tank.

A still further modified device is shown in Figs. 8 and 9. The device of these figures includes a sealing pad 52 received in a recess 54 of a permanent magnet 56, the recess providing pole pieces 58 at the ends of the magnet 56 each having a surface 60 for engagement with the wall of the tank so as to press the sealing pad 52 against such wall. In a device of Figs. 8 and 9, the magnet 56 itself constitutes the holding structure and backing member for the sealing pad 52. The device of Figs. 8 and 9 is also difficult to remove from the wall of the tank after it has been placed in sealing position. For this purpose an aperture 62 may be formed in either or both ends of the magnet 56 for the insertion of a screwdriver blade in order to enable the device to be lifted from contact with the wall of the tank.

All of the devices shown in the various drawings constitute an effective means for sealing a leak in a tank having walls of magnetic material, i. e., walls which are attracted by a permanent magnet. The device of Figs. 1 and 2 is particularly suitable for small leaks or leaks occupying a small area while the device shown in Figs. 3 and 4 is suitable for larger leaks or leaks occupying or spreading over a larger area. The device of Figs. 3 and 4 presses the pad against the wall of a tank with approximately twice the force of the device of Figs. 1 and 2 where the same size magnets are employed and the devices of Figs. 1 to 4 have in common the property that they are easily removed from the wall of a tank by reason of the handles 20. The devices of Figs. 5 to 9 inclusive, are also effective sealing devices and are somewhat simpler in structure than the devices of Figs. 1 to 4.

I claim:

1. A magnetic tank patching device comprising a pad of flexible resilient sealing material having a sealing portion providing a back surface and an oppositely directing sealing surface and a pad holding structure for holding said pad with its sealing surface pressed against the wall of a tank, said pad holding structure including at least one permanent magnet and providing magnetic pole portions at positions on opposite sides of said sealing portion of said pad, said holding structure also including a backing portion extending between said pole portions and in contact with said back surface of said pad, said backing portion being a pre-formed curved spring member having a convex surface in contact with said pad.

2. A magnetic tank patching device comprising a pad of flexible resilient sealing material having a sealing portion providing a back surface and an oppositely directing sealing surface and a pad holding structure for holding said pad with its sealing surface pressed against the wall of a tank, said pad holding structure including a pair of permanent magnets each providing magnetic pole portions, said magnets being positioned on opposite sides of said sealing portion of said pad, said holding structure also including a backing portion extending between said magnets and in contact with said back surface of said pad, said backing portion being a pre-formed curved spring member having a convex surface in contact with said pad.

3. A magnetic tank patching device comprising a pad of flexible resilient sealing material having a sealing portion providing a back surface and an oppositely directing sealing surface and a pad holding structure for holding said pad with its sealing surface pressed against the wall of a tank, said pad holding structure including a pair of permanent bar magnets each having pole pieces secured to its ends and extending laterally therefrom, said magnets being positioned on opposite sides of said sealing portion of said pad, said holding structure also including a backing portion extending between said magnets and in contact with said back surface of said pad, said backing portion being a pre-formed curved spring member having a convex surface in contact with said pad and having apertures in its ends each receiving one pole piece of one of said magnets, and means for holding said one pole piece in said apertures.

4. A magnetic tank patching device comprising a pad of flexible resilient sealing material having a sealing portion providing a back surface and an oppositely directing sealing surface and a pad holding structure for holding said pad with its sealing surface pressed against the wall of a tank, said pad holding structure including a pair of permanent bar magnets each having pole pieces secured to its ends and extending laterally therefrom, said magnets being positioned on opposite sides of said sealing portion of said pad, said holding structure also including a backing portion extending between said magnets and in contact with said back surface of said pad, said backing portion being a pre-formed curved spring member having a convex surface in contact with said pad and having apertures in its ends each receiving one pole piece of one of said magnets, and means for holding said one pole piece in said apertures, said magnets having handles attached thereto to assist in removing said magnets from said wall.

References Cited in the file of this patent
UNITED STATES PATENTS

| | | |
|---|---|---|
| 1,844,509 | Johnson | Feb. 9, 1932 |
| 2,727,650 | Moynihan | Dec. 20, 1955 |